(12) United States Patent
Weibel

(10) Patent No.: US 7,963,495 B2
(45) Date of Patent: Jun. 21, 2011

(54) CEILING MOUNTED LIFT FOR A MULTI-PURPOSE PROJECTOR

(75) Inventor: Hans Weibel, CH-Menzingen (CH)

(73) Assignee: Barry Charles Green, Menzingen (CH)

( * ) Notice: Subject to any disclaimer, the term of this patent is extended or adjusted under 35 U.S.C. 154(b) by 625 days.

(21) Appl. No.: 11/691,594

(22) Filed: Mar. 27, 2007

(65) Prior Publication Data

US 2008/0217499 A1   Sep. 11, 2008

(30) Foreign Application Priority Data

Mar. 9, 2007   (CH) .................................. 00 377/07

(51) Int. Cl.
*A47H 1/10* (2006.01)
(52) U.S. Cl. ......... 248/327; 248/669; 352/242; 352/243
(58) Field of Classification Search .................. 248/656, 248/669, 317, 327; 352/104, 242, 243
See application file for complete search history.

(56) References Cited

U.S. PATENT DOCUMENTS

| | | | | |
|---|---|---|---|---|
| 4,577,827 A | * | 3/1986 | Eliscu ............................ | 248/656 |
| 4,750,832 A | * | 6/1988 | Lloyd et al. .................... | 352/243 |
| 4,978,984 A | * | 12/1990 | Brookfield ..................... | 396/427 |

* cited by examiner

*Primary Examiner* — Terrell McKinnon
*Assistant Examiner* — Bradley H Duckworth
(74) *Attorney, Agent, or Firm* — Brian Roffe

(57) ABSTRACT

A ceiling mounted lift for a multimedia projector that can be installed into a hollow ceiling. The same is equipped with a frame-shaped base plate (2) that can be fitted to an original ceiling, and with a platform (5) receiving the projector that can be lowered in relation to the base plate (2) from a non-usage position into a usage position. For lowering and lifting the platform (5) lifting spindles (3) that can be driven equally in both rotation directions and co-operatively connected with spindle nuts (4) are provided. The lifting spindles (3) as well as the spindle nuts (4) are equipped with a circular thread, whereby the spindle nuts (4) consist of Nylon thread nuts.

8 Claims, 1 Drawing Sheet

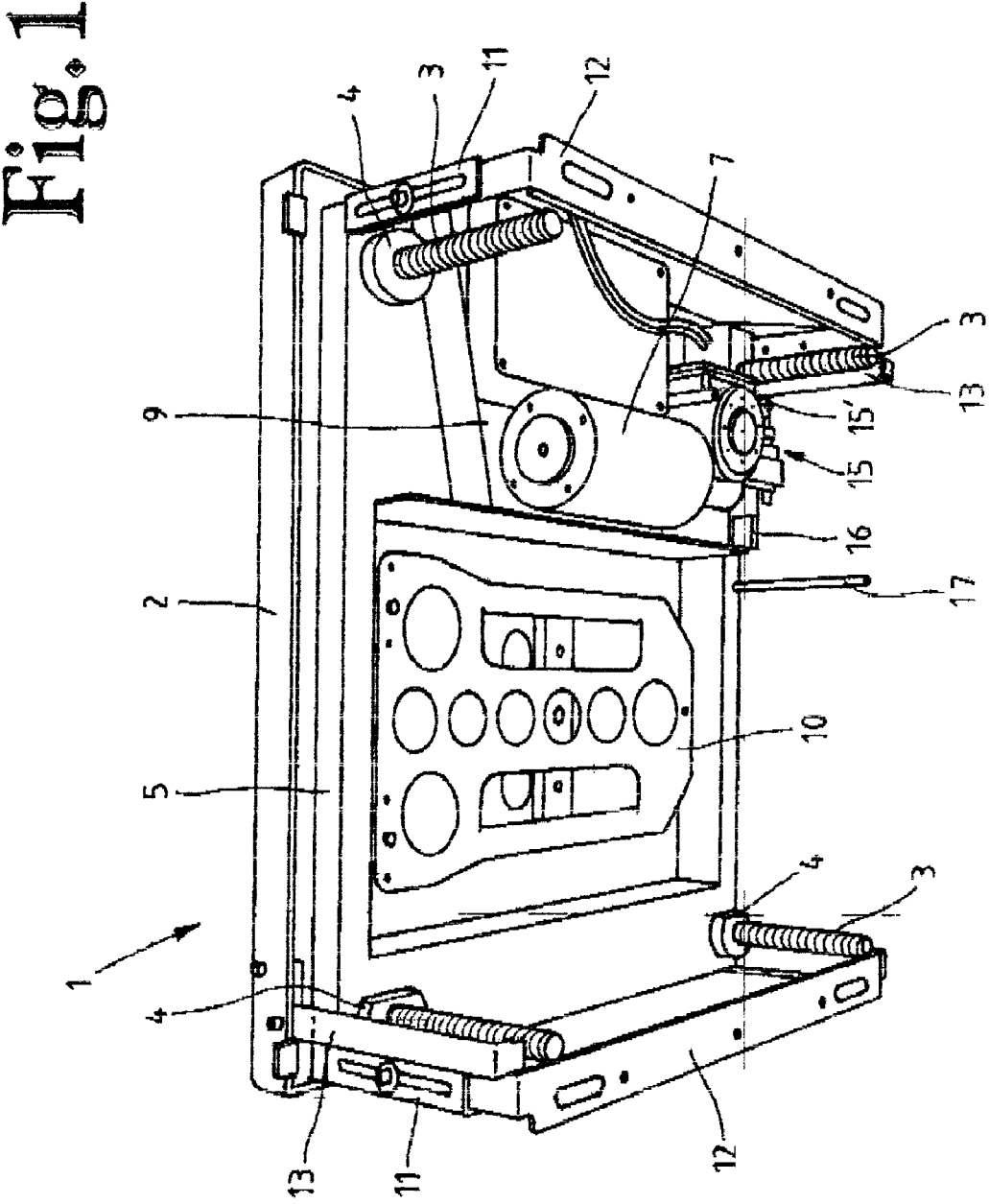

CEILING MOUNTED LIFT FOR A MULTI-PURPOSE PROJECTOR

The invention concerns a ceiling mounted lift for a multi-purpose projector, to be installed in a hollow ceiling.

Multimedia projectors, also known as "beamers", are often used in conference rooms, display rooms, training rooms, domestic rooms etc. The use of a ceiling mounted lift for the multimedia projector is known, and the same can normally be installed invisibly inside a hollow ceiling together with the projector. During use the projector can be lowered out of the hollow ceiling in a downward direction, whilst the same remains hidden inside the hollow ceiling when it is not in use, whereby the necessary cut-out in the hollow ceiling is normally closed by means of a cover plate.

A ceiling mounted lift of this type is for example known from EP-A-1 156 364. It comprises a frame-shaped base plate to be mounted on an original ceiling as well as a platform receiving the projector that can be lowered in relation to the base plate from a non-usage position into a usage position. For lowering and lifting the platform lifting spindles that can be driven equally in both rotation directions are provided, the same being co-operatively connected with relevant spindle nuts.

It is the purpose of the invention to further improve the ceiling mounted lift of the type mentioned above.

This task is solved in accordance with the invention by a ceiling mounted lift with the characteristics of Claims 1-8.

Further preferred embodiments of the ceiling mounted lift of the invention form the subject of the dependent Claims.

According to the invention the lifting spindles of the ceiling mounted lift as well as the spindle nuts are equipped with a circular thread, whereby the spindle nuts consist of Nylon thread nuts. In this way it is possible that the thread will not rattle when the same is operated without grease. Surprisingly it has also been found that an extremely long working life can be achieved with an initial light greasing with a special grease (Molykote special grease) without subsequent greasing being required. Tests carried out have proven that a working life of 100 years would result if the platform is lowered and lifted once a day. With conventional trapezoidal threads this would only be 4-7 years. After this period the platform would begin to rattle when moved, which would not only seriously damage the projector but would also be a nuisance from an acoustic point of view.

In addition the common drive of the lifting spindles is located within the quarter defined by the lifting spindles under the base plate and is fitted to the same according to the invention, whereby the platform is equipped with a recess enclosing the drive at least in the non-usage position. In this way the ceiling mounted lift of the invention is more compact and can be installed into correspondingly smaller hollow ceiling spaces more easily.

In addition the platform of the invention is equipped with a holding plate, the incline of which can be adjusted in relation to the platform, to which a quick replacement plate connected with the projector can be fitted. During the initial installation the projector can be adjusted horizontally, vertically, and also sideways in an infinitely variable way with the aid of the holding plate, exactly aligned with the screen, and subsequently fixed into place. After that the projector can be removed from the ceiling mounted lift installed in the hollow ceiling in less than a minute and without the use of tools at any time. The adjusted position of the holding plate remains unchanged, and the projector can be easily re-installed without having to align the same to the screen once more, e.g. it will be ready to operate immediately.

The ceiling mounted lift of the invention also comprises a control with control cables from the drive motor to the projector. According to the invention the motor is equipped with a torque limiter for automatically switching off the lifting process of the platform if the same should become stuck. The electronics will switch off the motor drive completely within a few seconds of the same becoming stuck.

The invention will now be described in more detail with reference to the drawing, whereby:

FIG. 1 shows a perspective view of an embodiment of a ceiling mounted lift of the invention for a multimedia projector.

FIG. 1 shows a ceiling mounted lift 1 for a multimedia projector which can be installed into a hollow ceiling between an original ceiling, for example a concrete ceiling, and a lower decorative ceiling. The ceiling mounted lift 1 comprises a frame-shaped base plate 2 that can be fitted to the original ceiling. In the corner areas of the base plate 2, four spindle bearings are fitted, which each hold a lifting spindle 3 projecting from the base plate 2 in a downward direction. The spindle bearings are not visible in FIG. 1, and neither are the drive wheels (for example chain or gear wheels) adjacent to the spindle bearings, which support each lifting spindle 3 but reference is made to EP-A-1 156 364 already mentioned above in this regard where the design of the base plate with the spindle bearings, the design of the lifting spindle with the drive, e.g., drive or chain wheels, as well as the entire installation in the hollow ceiling is illustrated and described in detail in this publication.

On each of the lifting spindles 3 a spindle nut 4 is held. The lifting spindles 3 as well as the spindle nuts 4 serve for lowering and lifting a platform 5 receiving the projector in a way described in more detail below and lowering the same from a non-usage position into a usage position in relation to the base plate 2. For this purpose the lifting spindles 3 can be driven by means of the drive wheels already mentioned from a common drive comprising a motor 7 and driveable in two rotation directions. The spindle nuts 4 are fitted on the side of the platform 5 facing away from the base plate 2.

According to the invention the lifting spindles 3 as well as the spindle nuts 4 are equipped with a circular thread, whereby the spindle nuts 4 consist of Nylon thread nuts. In this way it can be achieved that the thread does not rattle when it is operated without grease. Surprisingly it has however also been found that an initial light greasing with a special grease (Molykote special grease) can achieve an extremely long working life without requiring any subsequent greasing. Tests carried out have proven that when the platform 5 is lowered and lifted once a day a working life of 100 years can be achieved. With conventional trapezoidal threads this would be approx. 4-7 years. After this period the platform would begin to rattle when being moved, which would not only seriously damage the projector but would also be a nuisance from an acoustic point of view.

In addition, the drive comprising the motor 7 is located within the quarter or area defined by the lifting spindles 3 under the base plate 2 and fitted to the same, i.e., the base plate 2, according to the invention, whereby the platform 5 is equipped with a recess 9 enclosing the drive at least in the non-usage position. In other words, the height of the platform 5 can be freely adjusted despite the motor design thanks to the recess 9. The ceiling mounted lift is therefore more compact and can be installed more easily, e.g., into an even smaller hollow ceiling space.

A holding plate 10 for the projector is fitted to the platform 5 in its area outside of the recess 9 envisaged for the drive, the incline of the same being adjustable in relation to the platform 5. The adjustment is carried out by means of clamping screws and replaceable distancer elements, with which the holding plate 10 can be bounced. The projector itself is equipped with a quick replacement plate (not shown), which can be fitted to the holding plate 10 by inserting two slots under two fixing heads and a subsequent insertion into a handled screw.

During the initial installation the projector can be adjusted horizontally, vertically, and also sideways in an infinitely variable way with the aid of the holding plate 10, exactly aligned with the screen, and subsequently fixed into place. After that the projector can be removed from the ceiling mounted lift installed in the hollow ceiling in less than a minute and without the use of tools at any time. The adjusted position of the holding plate 10 remains unchanged, and the projector can be easily re-installed without having to align the same to the screen once more, e.g. it will be ready to operate immediately.

The ceiling mounted lift 1 further comprises a control with control cables to the motor 7 and the projector. According to the invention the motor 7 is equipped with a torque limiter for automatically switching off the lifting process of the platform if the same should become stuck. To re-set the activated emergency switch off mechanism the power supply from the mains can be interrupted for a pre-determined period (at least 30 seconds). Once the problem has been solved the electronic control can once more be operated.

In the corner areas of the platform 5 guides, e.g. fitting tabs 11 for two rails 12 are located, where a panel not shown here can be fitted for closing the cut-out in the decorative ceiling required for the installation of the ceiling mounted lift 1. The height of the rails 12 is continuously adjustable and held tightly for exact positioning.

The upper and the lower end positions of the platform 5 are each determined by means of an end switch 15 and 16 affixed to the platform 5, whereby the same co-operate with the switching and safety rails 13, e.g. abut against the base plate 2. The cylinder 15' envisaged on the end switch 15 effects the switching off of the motor 7 when the platform 5 is fully extended. When the platform 5 is fully retracted however the end switch 16 is responsible for switching off.

A cable holder 17 projecting away from the platform 5 and located mostly parallel to the lifting spindles 3 serves for fitting the cables plugged into the projector to avoid a possible loose contact of the plug and socket connection that may be expected due to the continuous moving of the cable. The cable holder 17 allows an orderly and controlled cable guidance. It prevents the catching or hanging through of cables.

The ceiling mounted lift of the invention could of course differ from the embodiment illustrated in FIG. 1. The provision of four lifting spindles 3 is for example not absolutely necessary, but rather of particular advantage.

The invention claimed is:

1. Ceiling mounted lift for a multimedia projector, to be installed in a hollow ceiling, comprising:
   a frame-shaped base plate to be fitted to an original ceiling,
   a platform for receiving the projector and that can be lowered from a non-usage position into a usage position in relation to the base plate, and
   lifting spindles co-operatively connected with spindle nuts and that are drivable in both rotation directions for lowering and lifting the platform in relation to the base plate,
   wherein the lifting spindles and the spindle nuts are equipped with a circular thread, and the spindle nuts consist of Nylon thread nuts,
   wherein there are four lifting spindles fitted in four corner areas of the frame-shaped base plate, and the lifting spindles being driven from a common drive which is located under the base plate and fitted to the base plate within an area defined by the lifting spindles, whereby the platform is equipped with a recess enclosing the drive at least in the non-usage position.

2. Ceiling mounted lift according to claim 1, wherein the Nylon thread nuts are fitted to the platform on a side facing away from the base plate.

3. Ceiling mounted lift according to claim 1, wherein the platform is equipped with a holding plate, the incline of the holding plate being adjustable in relation to the platform.

4. Ceiling mounted lift according to claim 1, wherein the lifting spindle drive comprises a motor with a torque limiter for automatically switching off the lifting process of the platform when the platform becomes stuck.

5. Ceiling mounted lift according to claim 1, further comprising a cable holder projecting away from the platform, the cable holder being arranged to fit at least one cable plugged into the projector to avoid a possible loose contact of a connection between the at least one cable and the projector.

6. Ceiling mounted lift according to claim 1, wherein the four lifting spindles are each supported in a corner area of the frame-shaped base plate for lowering and lifting the platform relative to the base plate, the spindle nuts are fitted to the platform, and the lifting spindles are drivable from the common drive in two rotation directions, further comprising a lifting spindle drive comprising a motor with a torque limiter for automatically switching off the lifting process of the platform when the platform becomes stuck.

7. Ceiling mounted lift according to claim 1, wherein the drive comprises a motor fit to the base plate.

8. Ceiling mounted lift according to claim 3, wherein the holding plate is fitted to the platform in an area outside of the recess such that the drive is situated to a side of the holding plate.

* * * * *